(12) United States Patent
Matsuda

(10) Patent No.: US 11,068,210 B2
(45) Date of Patent: Jul. 20, 2021

(54) INFORMATION PROCESSING APPARATUS AND METHOD

(71) Applicant: CANON KABUSHIKI KAISHA, Tokyo (JP)

(72) Inventor: Kotaro Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/656,256

(22) Filed: Oct. 17, 2019

(65) Prior Publication Data

US 2020/0133590 A1 Apr. 30, 2020

(30) Foreign Application Priority Data

Oct. 25, 2018 (JP) .............................. JP2018-201270

(51) Int. Cl.
*G06F 3/12* (2006.01)
*H04L 29/08* (2006.01)

(52) U.S. Cl.
CPC .......... *G06F 3/1204* (2013.01); *G06F 3/1226* (2013.01); *H04L 67/025* (2013.01); *H04L 67/125* (2013.01); *G06F 3/1288* (2013.01); *G06F 3/1292* (2013.01)

(58) Field of Classification Search
CPC .... G06F 3/1204; G06F 3/1226; G06F 3/1288; G06F 3/1292; H04L 67/025; H04L 67/125
USPC ........................................ 358/1.15, 1.9, 1.16
See application file for complete search history.

(56) References Cited

U.S. PATENT DOCUMENTS

| 2011/0043857 A1* | 2/2011 | Hiroki ................... G06F 3/1292 358/1.15 |
| 2017/0109104 A1* | 4/2017 | Dahlberg ............... G06F 3/1209 |
| 2019/0179583 A1* | 6/2019 | Igarashi ............. H04N 1/00037 |

FOREIGN PATENT DOCUMENTS

JP 2004-86688 A 3/2004

\* cited by examiner

*Primary Examiner* — Quang N Vo
(74) *Attorney, Agent, or Firm* — Canon U.S.A., Inc. IP Division

(57) ABSTRACT

An information processing apparatus according to various embodiments causes a Bluetooth® device to which connection of the web application is permitted to execute a request via a web browser and an operating system (OS) by using Bluetooth® communication, thereby acquiring an identifier of the Bluetooth® device.

11 Claims, 10 Drawing Sheets

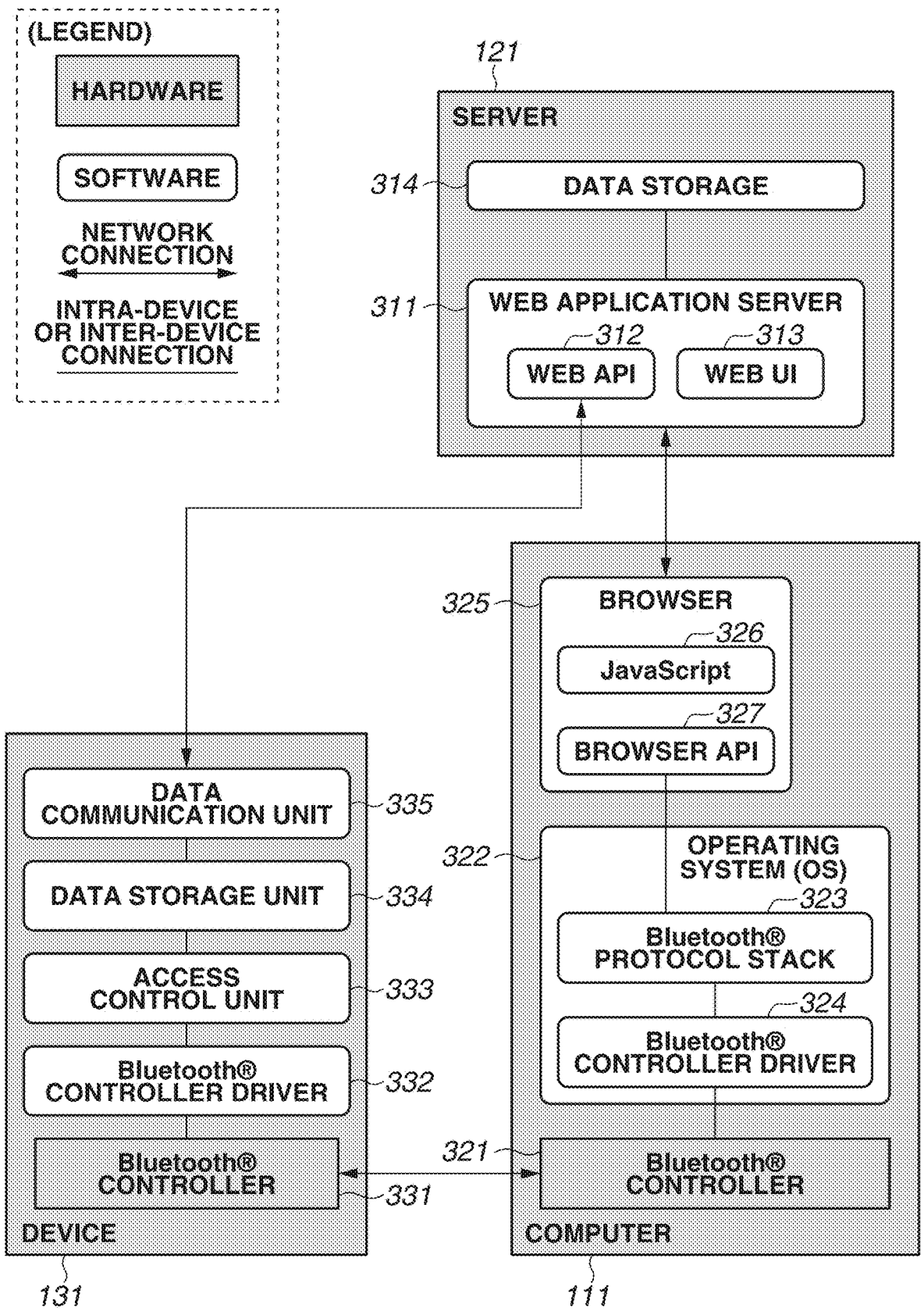

Browser https://printer.com/monitor/registration/

MONITORING TARGET DEVICE REGISTRATION

▨ DEVICE INFORMATION INPUT

SELECT MODEL NAME
[ Printer Model 9 ▼ ] ~501

INPUT SERIAL NUMBER
[ ZBCWD2508812 ] ~502

( RETURN )  ( REGISTER )
                        504

Browser https://printer.com/monitor/registration/

MONITORING TARGET DEVICE REGISTRATION IS COMPLETED

▨ REGISTERED DEVICE

MODEL NAME: Printer Model 9
SERIAL NUMBER: ZBCWD2508812

( RETURN )

INFORMATION PROCESSING APPARATUS AND METHOD

BACKGROUND

Field of the Disclosure

The present disclosure relates to a technique for a web application to acquire device information using wireless communication.

Description of the Related Art

In recent years, devices called Internet of Things (IOT), which are capable of connecting to the Internet, have been rapidly evolving and growing in number. Use cases of IOT devices include one in which an IOT device transmits acquired sensor data or statuses of the device and parts to a web server so that the device may be monitored remotely.

In an example use case of a printer, serving as an IOT device, remotely monitoring the remaining quantities of consumable items, such as toner and paper, is enabled. The printer is capable of notifying a web server of an alert by transmitting thereto the alert when the remaining quantity level of a consumable item has reached "LOW". This configuration can be utilized to make it possible to proactively automatically deliver a new supply of the consumable item to the user of the printer when the web server has detected the "LOW" state of the remaining quantity level of a consumable item.

To implement such a use case of detecting the remaining quantities of and automatically delivering consumable items, the following configuration, for example, is used. Users are asked to sign a consumable-item automatic delivery contract via, for example, an online shopping website, and the users register, in a web server, respective printers being used by the users to set the printers as monitoring targets. For the registration in the web server, serial numbers are used as identifiers unique to the respective printers. Each user who has signed the automatic delivery contract and the serial number of the corresponding printer are associated with each other. Thus, a supply of a consumable item can be delivered to a person who has signed the contract and is a user of the printer with a serial number for which the "LOW" state of the remaining quantity level of the consumable item has been detected.

Japanese Patent Application Laid-Open No. 2004-86688 discusses a system in which device information is registered in device information database from computers in sales stores that have sold printers. The device information includes the serial numbers of the printers and sales store codes. In the system, when an order of consumables for any one of the printers is received, the sales store identified by the serial number is notified that the order has been received. Japanese Patent Application Laid-Open No. 2004-86688 discusses a method for inputting a serial number of a printer, in which a code (e.g., bar code) obtained by the serial number being encoded is read by a reader connected to a computer in a sales store. This technique is based on the premise that such a code be read by a dedicated reader, and accordingly has low general-purpose versatility.

In this situation, an IOT device and a computer that are accessing, via a web browser, a website to which the IOT is intended to be registered may support a standard wireless communication function, such as Bluetooth®. Thus, a mechanism is desired in which the computer obtains a unique identifier for the IOT device from the IOT device and register the identifier in a website by using such a function.

Here, in order to use a Bluetooth® device as the IOT device from a computer, it is necessary to perform pairing and connection from a Bluetooth® device management application function in the operating system (OS). When a device needs a dedicated device driver, it is further necessary that the driver be obtained and installed in the OS. In such a case, information about the Bluetooth® device acquired via the OS is manually registered into the website.

Furthermore, the above-described website may be enabled to provide a web application that automatically obtains the unique identifier of the IOT device. However, the following troublesome work is involved in using a website to read information on a Bluetooth® device as the IOT device connected to a computer from the web application.

First, a browser plug-in accessible to an OS function for the Bluetooth® device is created and installed in the web browser. Furthermore, it is necessary to grant the plug-in an execution permission to, for example, use a driver installed in the OS. It is necessary that various browser plug-ins be prepared to correspond to various types of OS and browser. The provider side needs to program the web application so that the various browser plug-ins can be separately used in accordance with use environments.

SUMMARY

According to an aspect of some embodiments, an information processing apparatus that a web browser operates on and that executes a web application provided by a server by using the web browser, the information processing apparatus including at least one memory storing instructions related to the web application. The instructions cause the information processing apparatus to execute an acquisition instruction for acquiring an identifier of a device by using the web browser, and transmit, to the server, an identifier included in a response returned from the device following the acquisition instruction.

Further features of various embodiments will become apparent from the following description of exemplary embodiments with reference to the attached drawings.

BRIEF DESCRIPTION OF THE DRAWINGS

FIG. 3 illustrates an example of the software and hardware configurations of individual apparatuses within the system.

FIGS. 5A and 5B each illustrate an example of screens provided by a browser that executes a web application.

DESCRIPTION OF THE EMBODIMENTS

Figure 1:
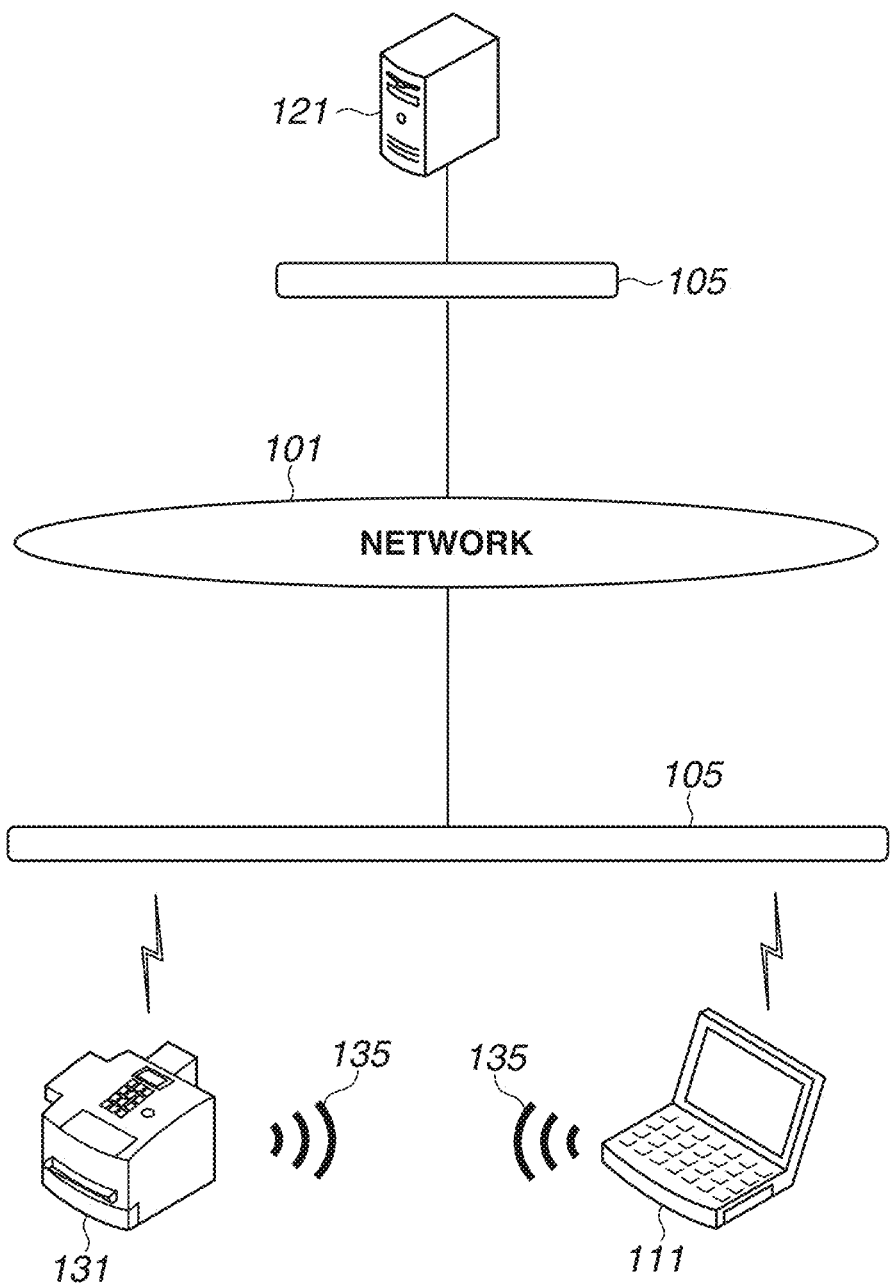
FIG. 1 illustrates an example of the configuration of a network system according to some embodiments.

FIG. 1 illustrates an example of a system configuration and a network configuration for some embodiments. A network 101 is the Internet, an intranet, or the like. A network 105 is, for example, a private network, a local area network (LAN), or the like. While the network 105 is a terminal network to which a device, such as a computer, is connected, the network 105 is not limited to a wire communication network and may be a wireless communication network, such as a wireless LAN and a cellular phone communication network. The system further includes a computer 111. Examples of the computer 111 are various in form and type and include a personal computer, a laptop computer, a tablet computer, and a smartphone. A server 121 provides an application via a network.

An IOT device 131 is connectable to the computer 111 by wire and/or wirelessly. The device 131 is capable of communicating with the server 121 via the networks 101 and 105. The present exemplary embodiment will be described with a printer taken as an example of the device 131. Examples of the device 131 to which various embodiments can be applied include a home electric appliance, a smart voice assistant device, and a three-dimensional printer.

The computer 111 and the device 131 are connected by a wireless communication connection 135. The present exemplary embodiment will be described with Bluetooth® connection taken as an example thereof. Hereinafter, a device that is connected to the computer 111 via a Bluetooth® connection and serves as a target of operation, such as information readout, may be referred to as a Bluetooth® device.

In the present embodiment, the computer 111 on which a web browser operates is assumed to utilize a technique called Web Bluetooth®. In this technique, a new web standard has been proposed to the World Wide Web Consortium. Web Bluetooth® is directed to enabling software that is equivalent to a conventional device-driver to be downloaded in an ad-hoc manner and used as a JavaScript® program and to access, through the web application, the Bluetooth® device connected to the computer.

Figure 2:
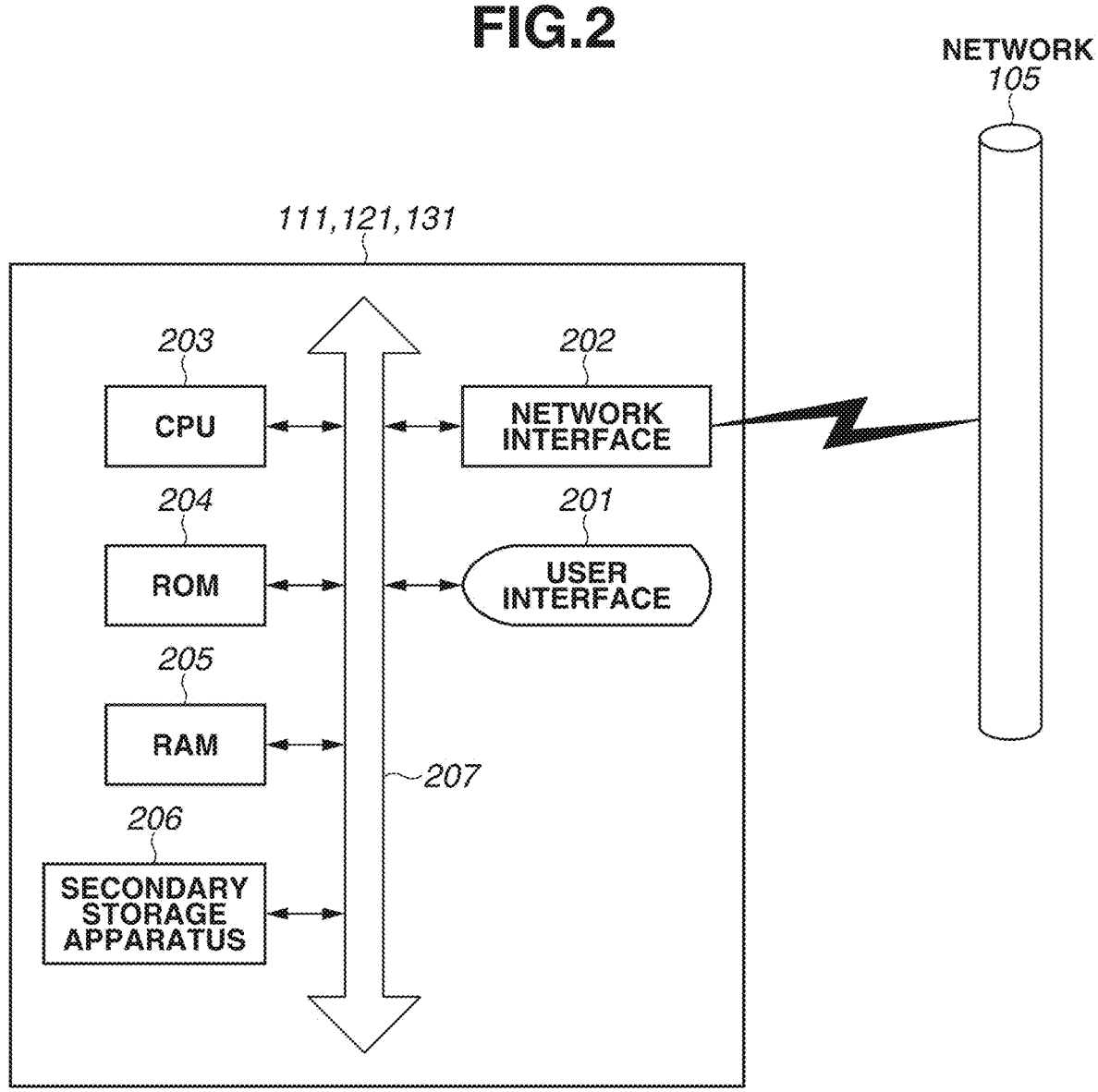
FIG. 2 illustrates an example of the hardware configuration of an information processing apparatus.
Figure 4A:
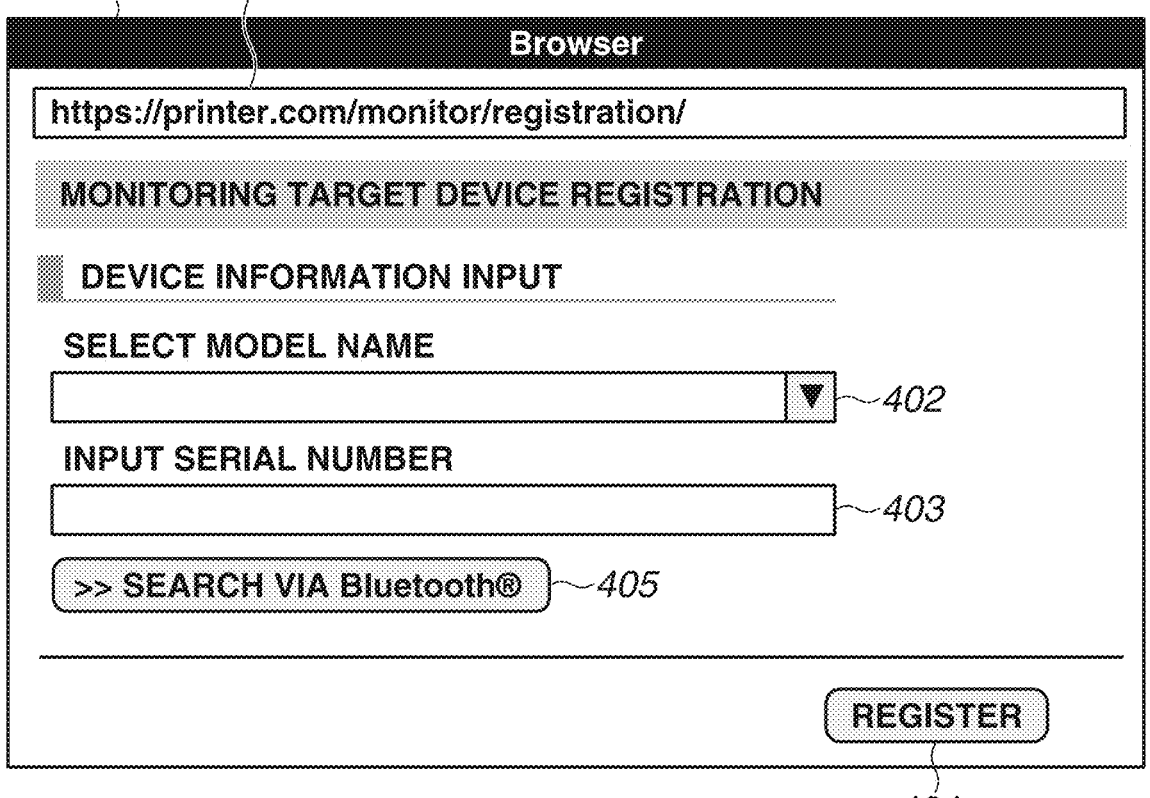
FIGS. 4A and 4B each illustrate an example of screens provided by a browser that executes a web application.
Figure 4B:
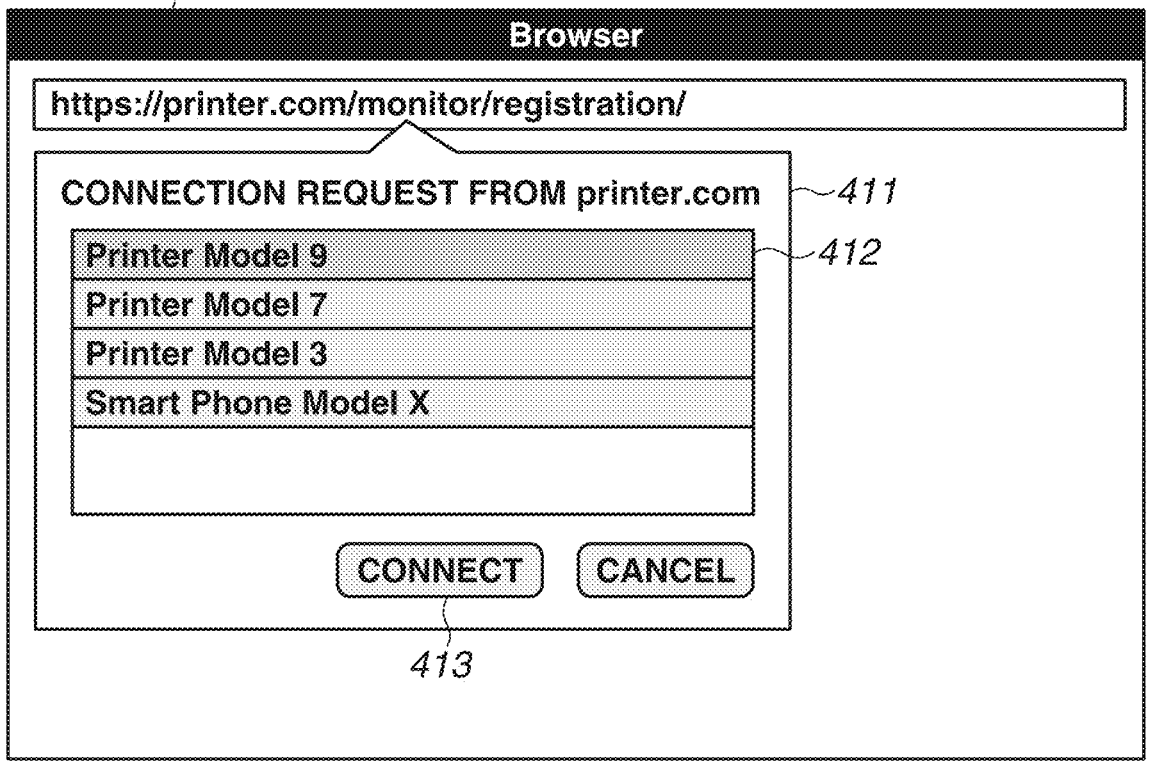

FIG. 2 illustrates an example of each of the hardware configurations of information processing apparatuses, the computer 111, the server 121, and the device 131. The server 121 may be implemented in the form of one or more information processing apparatuses or one or more virtual machines that are implemented on the one or more information processing apparatuses.

A network interface 202 connects to a network, such as a LAN, to communicate with another computer and/or a network device. A method for the communication may be either wire or wireless communication. A read-only memory (ROM) 204 has an embedded computer program and data recorded therein. A random access memory (RAM) 205 is a temporal memory area. A secondary storage apparatus (hereinafter referred to also as storage apparatus) 206 may be, for example, a hard disk drive (HDD) and a flash memory. A central processing unit (CPU) 203 executes computer programs read from, for example, the ROM 204, the RAM 205, and the storage apparatus 206. A user interface 201 processes input and output of information and signals with a display, a keyboard, a mouse, a button, a touch panel, and the like. The computer 111 that is not provided with those hardware components can be connected from and be operated by another computer with, for example, Remote Desktop or Remote Shell. These components are connected to one another via an input/output interface 207.

When the device 131 is a printer, the device 131 further includes components (not illustrated) such as a printer engine, a configuration for paper feeding and paper discharge, and a configuration for feeding consumable items, such as toner, to the engine. When the device 131 is an IOT device other than a printer, the device 131 includes a configuration for using replaceable consumable items.

FIG. 3 illustrates an example of the software configurations of the individual apparatuses (111, 121, and 131) within a network system. Software elements installed in each of the hardware devices are individually executed by the corresponding CPU 203 and are configured to be able to communicate with one another as illustrated by arrows indicating connections (e.g., network connections).

The server 121 has a web application server 311 installed therein. The web application server 311 provides a web application programming interface (API) 312. The web application server 311 provides a web user interface (UI) 313. A data storage 314 saves and stores therein data to be used by the web application server 311. The web application server 311 returns a response in the following manner in accordance with a HyperText Transfer Protocol (HTTP) request from a client. The web UI 313 may return a content file in HyperText Markup Language (HTML), JavaScript, or the like as the response. The web API 312 may read and/or write data from and into the data storage 314 and return resultant data in Extensible Markup Language (XML), JavaScript Object Notation (JSON), or the like as the response.

The computer 111 includes a Bluetooth® controller 321 that processes Bluetooth® connection and communication. The computer 111 has an operating system (hereinafter OS) 322 installed therein. The OS 322 is basic software that manages and controls each of the hardware components in the computer 111 and executes and manages various computer programs. The OS 322 includes a Bluetooth® protocol stack 323. The Bluetooth® protocol stack 323 includes, for example, program modules, a library, and an API for using Bluetooth® protocols. The OS 322 further includes a Bluetooth® controller driver 324. The Bluetooth® controller 321 is driven and controlled under an instruction from the Bluetooth® protocol stack layer 323.

The computer 111 has a web browser 325 installed therein. The browser 325 is an application that displays and executes an HTML or JavaScript content. JavaScript code 326 is executed on the browser 325. The browser 325 acquires HTML code and/or the JavaScript code 326 via a network from the web application server 311 that is executed by the server 121, and executes and displays the content. The browser 325 includes a browser API 327. The browser API 327 is provided to enable access to a function provided by the OS 322 from the JavaScript code 326 that is executed on the browser 325.

The device 131 includes a Bluetooth® controller 331 that processes Bluetooth® connection and communication. The device 131 includes a Bluetooth® controller driver 332 installed therein. The Bluetooth® controller driver 332 drives and controls the Bluetooth® controller 331. The device 131 further includes an access control unit 333. The device 131 includes a data storage unit 334. The access control unit 333 determines communication contents received via Bluetooth® connection, controls access permission to the data storage unit 334, and controls necessary data to be read and written. A data communication unit 335 transmits data within the device 131 to the web API 312 in the web application server 311. Data in the device 131 is transmitted via the networks 105 and 101 to the server 121 and collected in the server 121. For example, when the device 131 is a printer, information (such as the serial number, the model name, and the lifetime print count of the printer, the remaining quantities of consumable items, the presence/absence of an error, and an error code) is collected, so that the printer can be remotely monitored.

FIGS. 4A and 4B and FIGS. 5A and 5B illustrate examples of execution and display, on the browser 325, of a web application provided by the server 121. A procedure for registering the device 131 as a monitoring target in the server 121 by using the computer 111 will be first described.

A screen 400 is a window of the browser 325 that is displaying and executing HTML and JavaScript content forming a web application that the computer 111 acquires from the web application server 311 while being connected to the server 121. A uniform resource locator (URL) 401 is a URL for the web application server 311 that is being open on the browser 325. A control 402 is used for selecting a model name of a device to be registered. A control 403 is used for inputting the serial number of the device to be registered. A button control 404 is used for transmitting and registering device information on the device, which is thus selected and input, to and in the web application server 311. In a case where a user manually inputs the device information, the user inputs the information using the controls 402 and 403.

As described above, manual inputting involves an inconvenience in that correct information is not registered in the server 121 when the serial number for uniquely identifying the device is erroneously input. To avoid this inconvenience, the present embodiment additionally provides a "SEARCH VIA BLUETOOTH®" button 405 as means for starting automatic input of the device information.

A screen 410 is a permission prompt for a domain of the web application server 311 to search for a device present within the Bluetooth® communication range of the computer 111 and connect the found device using Web Bluetooth®. A connection permission prompt 411 provides choices for a device to which Web Bluetooth® is to be connected. A list control 412 is used for selecting the device to which Web Bluetooth® is to be connected. In the list control 412, the device names of Bluetooth® devices are listed. A button control (connection permission button) 413 is used for executing operation to permit the connection of Web Bluetooth®.

A screen 500 displays the device information that has been acquired through the connection and the communication processes by using Web Bluetooth® and has been automatically input. A control 501 is used for displaying a model name that has been automatically input. A control 502 is used for displaying a serial number that has been automatically input. To prevent user's erroneous inputting and erroneous operation, the controls 501 and 502 can be set inoperable after automatic inputting is completed. A registration button control 504 functions similarly to the button control 404.

A screen 510 displays a registration result after the registration button 504 is pressed. The screen 510 displays and notifies the user of whether the registration has ended in success or failure.

Figure 6:
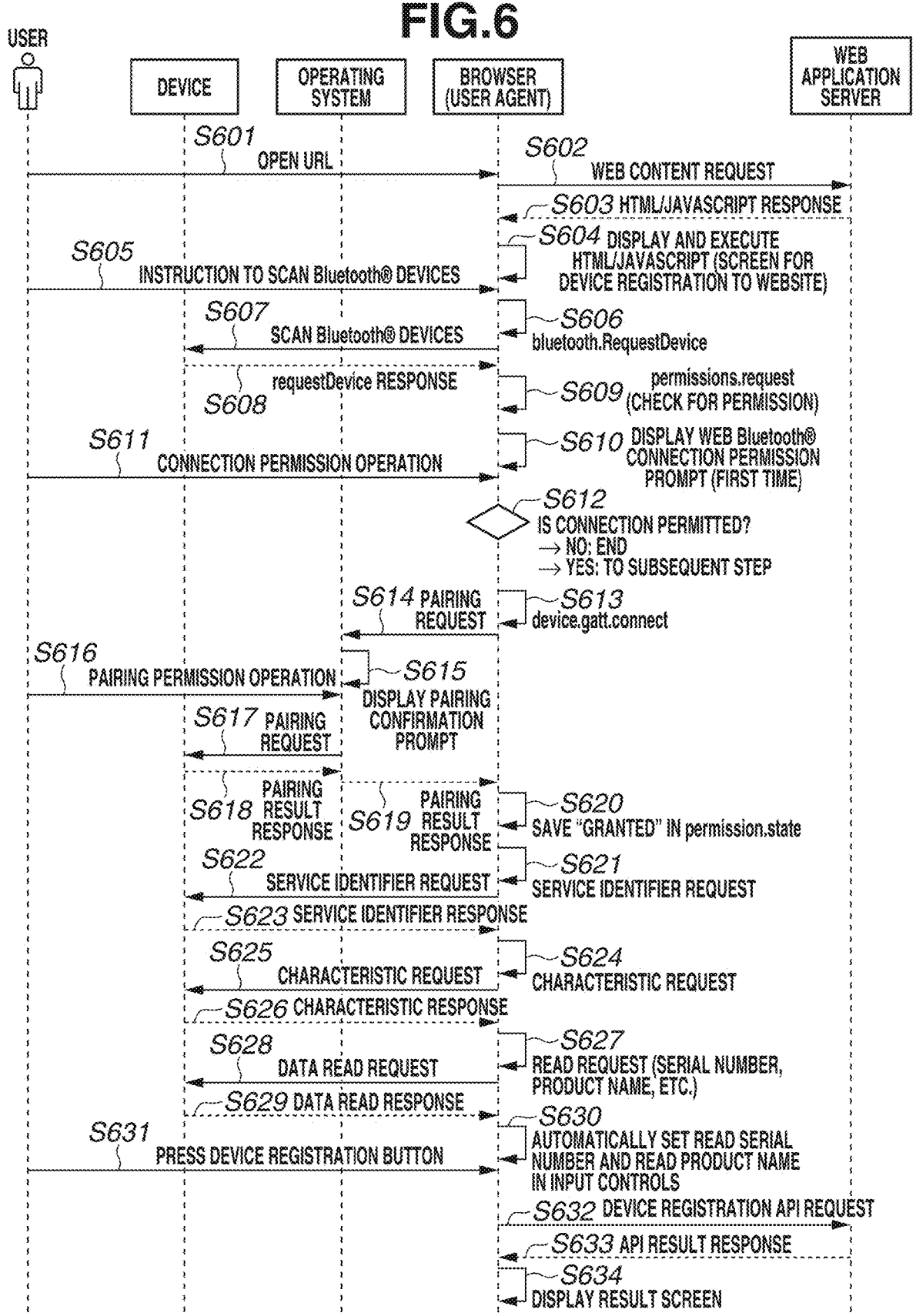
FIG. 6 is a flowchart illustrating processing in the system that includes a web application.

FIG. 6 is a flowchart illustrating processing to be performed on the network system using the web application described with reference to FIGS. 4A and 4B and FIGS. 5A and 5B.

In S601, the browser 325 is started up, and the URL 401 of the web application is designated.

In S602, the browser 325 transmits a web content request to the web application server 311. In S603, the web application server 311 returns, as a response, contents of HTML/JavaScript or other format that forms the web application. In S604, the browser 325 displays and executes the received HTML/JavaScript contents and displays the above-described screen 400.

In the S605, the browser 325 detects pressing of the "SEARCH VIA BLUETOOTH®" button 405 within the screen 400. This button operation enables the user to issue an instruction to scan Bluetooth® devices on a network.

In S606, the browser 325 issues a Bluetooth® .requestDevice instruction to the browser API 327 from within a program of the JavaScript code 326. In S607, in order to search for devices capable of connecting via Bluetooth® to the computer 111, the browser 325 controls transmission of a request using Bluetooth® via the OS 322. In S608, the device 131 that has received the request returns a requestDevice response. The browser 325 stores information (such as device names and vendor names) about Bluetooth® devices that have returned responses via the OS 322.

In S609, the browser 325 checks whether permission.state of each of the devices that have returned responses has been "granted". In S610, the browser 325 displays the device information in the above-described list control 412 in the screen 410 if it is the first time of such connection. In S611, the browser 325 accepts, from the user, a selection of a device to be connected. Additionally, if pressing of the connection permission button 413 is detected, the browser 325 permits the web application to establish Web Bluetooth® connection to a Bluetooth® device that corresponds to the selection. Here, an example of the selected Bluetooth® device (selected device) is the device 131. In S612, the browser 325 determines whether the connection has been permitted in the connection permission prompt 411. If the connection has not been permitted, the processing ends. If the connection is permitted, the processing proceeds to the subsequent operation.

In S613, the browser 325 issues a device.gatt.connect instruction to the browser API 327 from within the program of the JavaScript code 326 with a designation of the device to be connected. In S614, the browser 325 transmits a Bluetooth® connection pairing request to the device 131 via the OS 322.

In S615, the OS 322 displays a Bluetooth® pairing confirmation (determination) prompt screen. In S616, the user executes a pairing permission operation. In S617, the OS 322 transmits a pairing request to the device 131. In S618, the device 131 returns a pairing result as a response to the OS 322. In S619, the OS 322 returns the pairing result as a response to the browser 325.

In S620, the browser 325 stores, in the storage apparatus 206, identification information for the web application, identification information (e.g., the device name) for the device 131 permitted to be connected, and a value indicating that permission.state is "permitted", in association with one another. The information thus stored in association with one another is managed by the browser 325. For connection for the second and subsequent times, the selection processing in S610 with a prompt displayed can be omitted if checking permission.state in S609 finds that the device has been stored as a permitted device.

In S621, from within the program of the JavaScript code 326, the browser API 327 is requested for a Bluetooth® service identifier that the device 131 provides. In S622, the browser 325 inquires of the device 131 for the service identifier via the OS 322. In S623, the device 131 returns, as a response, a service identifier that can be provided. For example, when the device 131 is a printer, a service identifier that indicates a printer service is acquired.

In S624, from within the program of the JavaScript code 326, the browser API 327 is requested for a list of characteristics that can be acquired with the service identifier that the device 131 provides. In S625, the browser 325 requests the device 131 via the OS 322 for the list of characteristics for the service identifier. In S626, the device 131 returns, as a response, the list of characteristics that can be provided. For example, for the printer service, a serial number, a model name, and other characteristics, such as the lifetime print count of the printer, the remaining quantities of consumable items, the presence/absence of an error, and an error code, can be acquired as the characteristics.

In S627, from within the program of the JavaScript code 326, a read request instruction is issued to the browser API 327 for the serial number as a unique identifier for each device and the model name among the characteristics that the device 131 provides. In S628, the browser 325 transmits a read request to the device 131 via the OS 322 for those specified as above among the characteristics. In S629, the device 131 acquires the designated data from the data storage unit 334 via the access control unit 333 and returns the characteristic data as a response.

In S630, within the program of the JavaScript code 326, the serial number and the model name are automatically input to the respective controls 402 and 403 on the screen 400 from data that is received by the browser 325, and the screen 500 is displayed. On the screen 500, the controls 501 and 502 that have values already input thereto are displayed.

In S631, the browser 325 detects that the user has pressed the registration button 503 via the screen 500. In S632, within the program of the JavaScript code 326, device registration into a website is executed. Specifically, the browser 325 transmits a device registration request to the web API 312 in the web application server 311. The device registration request includes the serial number and the model name automatically input to the screen 500. The web application server 311 writes necessary data, such as the serial number, in the data storage 314 based on the contents of the device registration request. Thereafter, in S633, the web application server 311 returns to the browser 325, as a response from the web API 312, whether processing corresponding to the device registration request has ended in success or failure. In S634, the screen 510 that presents the device registration result is displayed via the browser 325.

First Application Example

Figure 7:
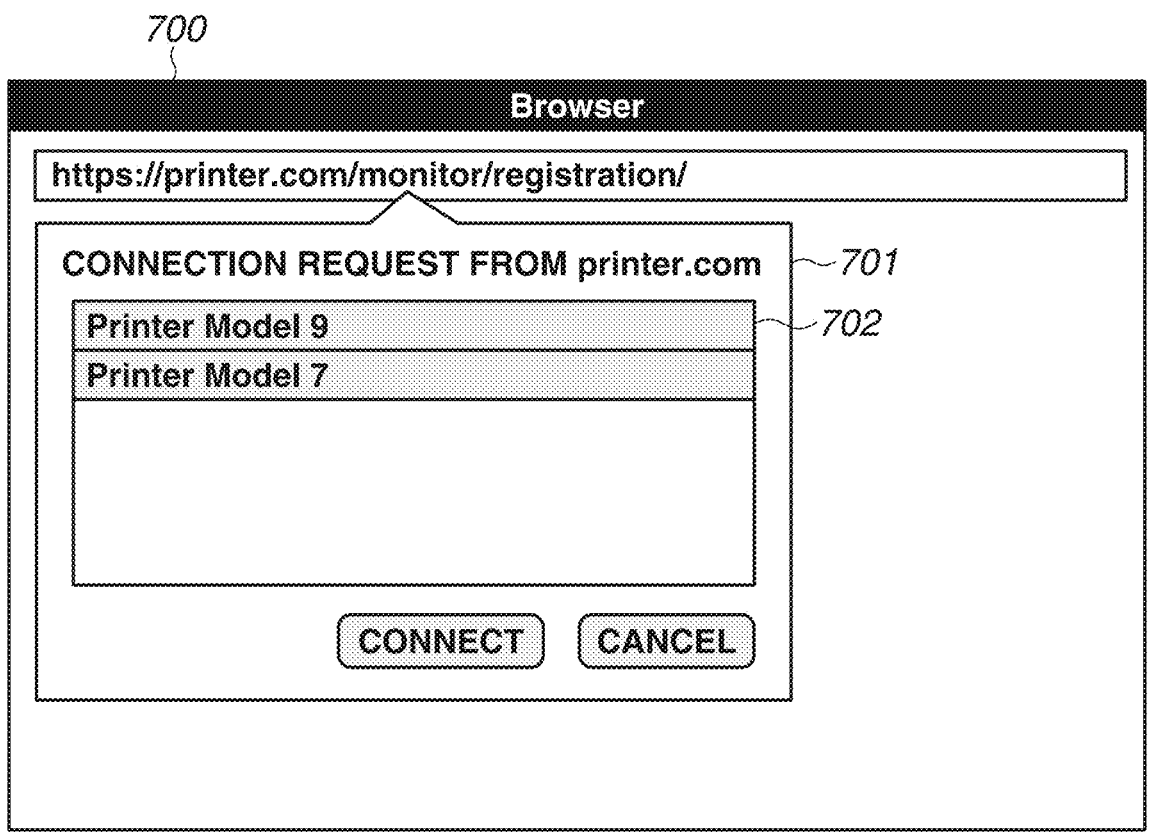
FIG. 7 illustrates an example of screens provided by a browser that executes a web application.
Figure 8:
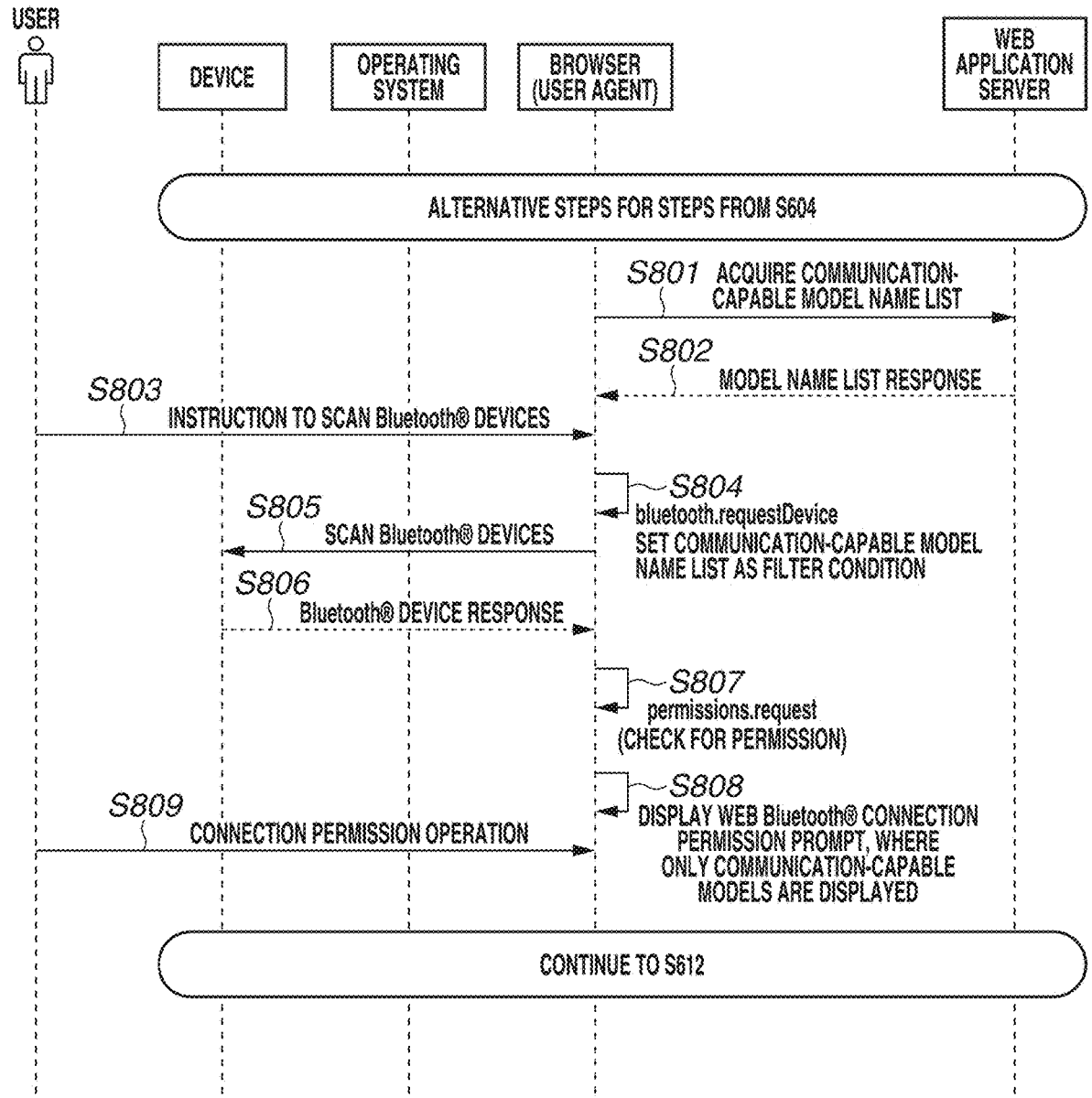
FIG. 8 is a flowchart illustrating additional processing according to a first application example.

A description will be provided of another example in which the browser 325 executes and displays a web application provided by the server 121 with reference to FIGS. 7 and 8.

FIG. 7 illustrates a screen 700, which is another example of a connection permission prompt screen illustrated above as the screen 410. A connection permission prompt 701 provides choices for a device to which Web Bluetooth® is to be connected. A list control 702 is used for selecting the device to which Web Bluetooth® is to be connected FIG. 8 is a flowchart illustrating processing involving the web application in the system. FIG. 8 illustrates processing with a part of the processing illustrated in FIG. 6 being expanded.

On the screen 410, all devices that are capable of communicating via Bluetooth® with the computer 111 are displayed as candidates for the connection destination in a list in the connection permission prompt 411. Even when it is desired to search for, for example, a printer, various Bluetooth® types of devices, such as a smartphone and a digital camera, may be displayed in a list. Furthermore, even when a printer is to be searched for, it may be desired to exclude, from the candidates, a printer that is incapable of connecting to and communicating with the web application server 311. When the list control 412 displays the name of a printer, the user may misunderstand the printer as being eligible to be registered in the website. Even if the registration in the website has ended in success, the registration has no meaning because the web application server 311 cannot collect data on the selected printer that is incapable of connecting and communicating.

Accordingly, a description will be given of a method for providing only devices of a specific type as choices on the connection permission prompt screen with reference to FIG. 8. In this example, the specific type indicate printers capable of connecting to and communicating with the server 121.

Specifically, the following flowchart is performed as alternative operations for operations from S604.

In S801, an acquisition request for acquiring the above-described specific type (model name) is transmitted to the web API 312 within the program of the JavaScript code 326. In S802, the web API 312 returns, as a response, a list of model names of devices capable of connecting and communicating.

A process similar to that in S605 is performed in S803. In S804, the browser 325 issues a Bluetooth® .requestDevice instruction to the browser API 327 from within the program of the JavaScript code 326 as the browser 325 does in S606 described above. A difference between S802 and S606 described above lies in that the acquired list of model names in S802 is set as a filter condition in the requestDevice instruction. Processes similar to those in S607 to S609 are performed in S805 to S807.

In S808, when the web application is to be connected for the first time, a list of Bluetooth® devices as candidates for a connection destination is displayed as illustrated in FIG. 7. In this case, candidate devices capable of connecting to the web application server 311 are enumerated in the list control 702 in accordance with the filter condition. A process similar to that in S611 is performed in S809. The processing that follows continues to S612.

Second Application Example

Figure 9A:
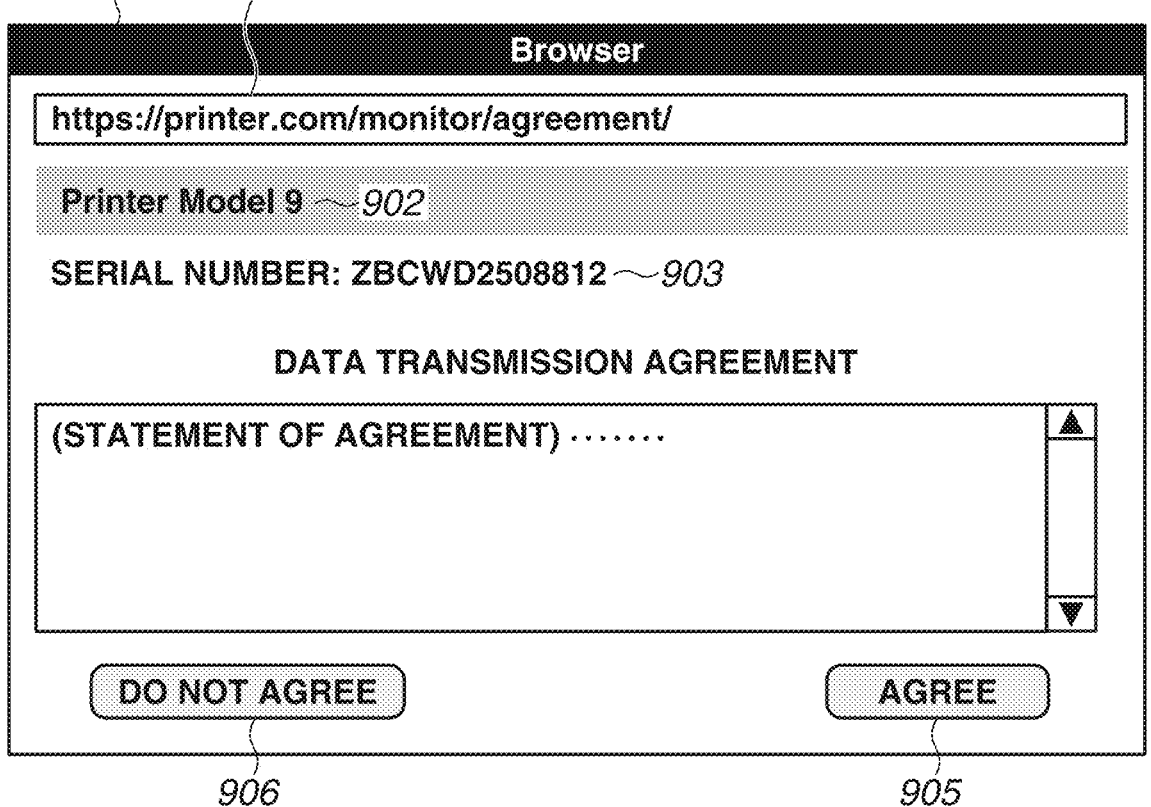
FIGS. 9A and 9B illustrates an example of screens provided by a browser that executes a web application.
Figure 9B:
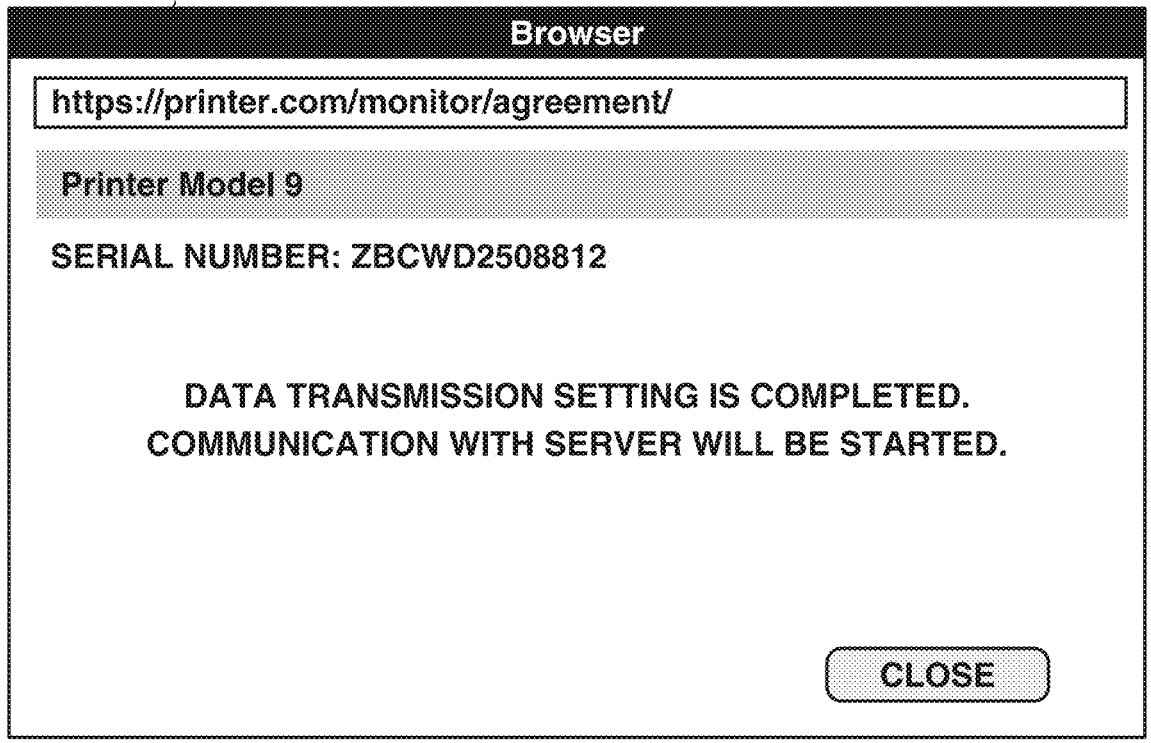
Figure 10:
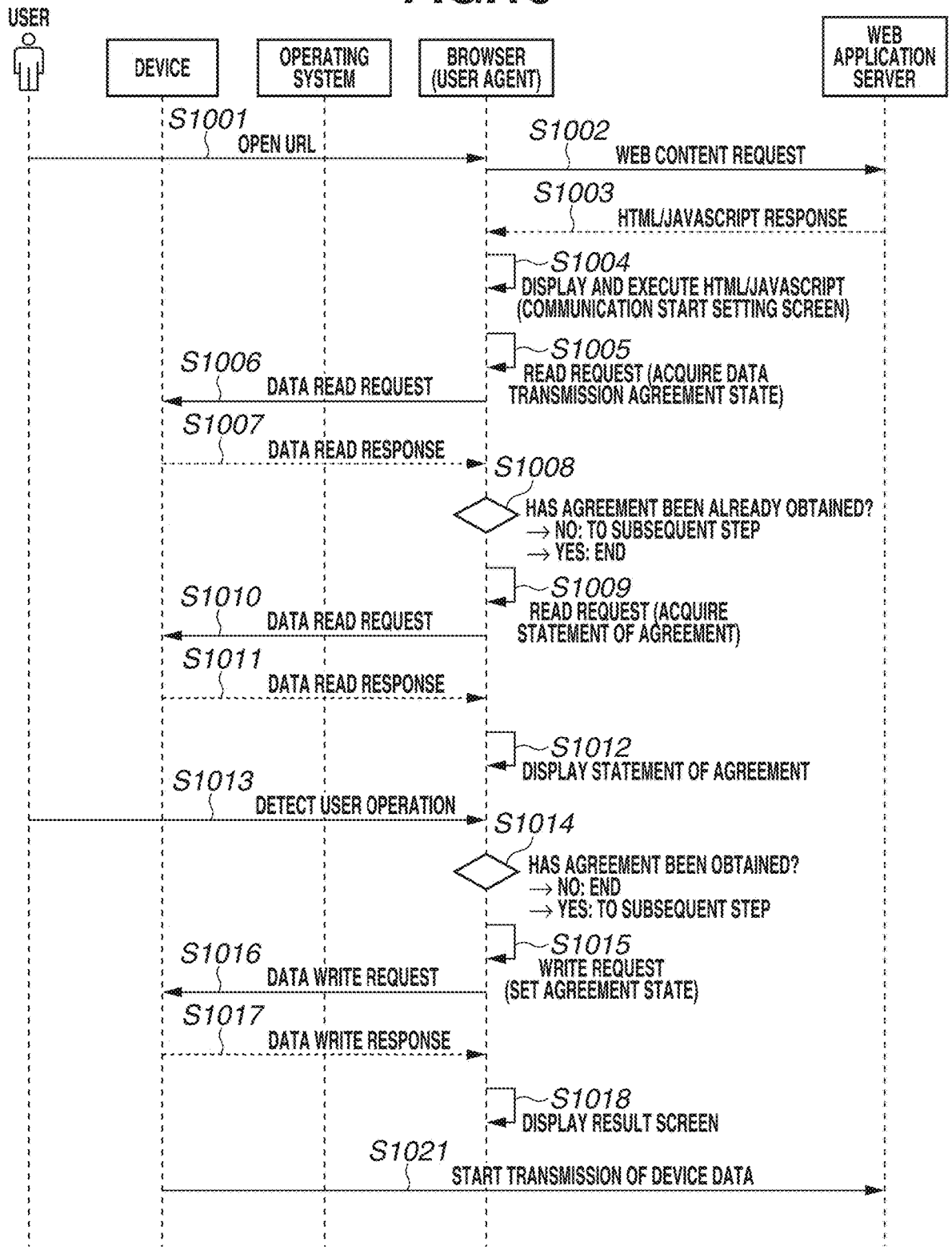
FIG. 10 is a flowchart illustrating additional processing according to a second application example.

A description will be further provided of a method for setting the start of communication from the device 131 to the server 121 in addition to the device registration execution processing by the browser 325 of the web application provided by the server 121, with reference to FIGS. 9A and 9B and FIG. 10.

After the serial number of the device 131 is registered in the server 121, it is necessary that a procedure for starting data transmission from the device 131 to the server 121 be performed. Generally, in order to implement operations for this procedure, it is necessary to operate a screen on an operation unit in the main body of the device 131 to perform the procedure for starting the data transmission. In the present exemplary embodiment, however, a small IOT device is also assumed to be used as the device 131 a. Examples of such an IOT device include a device with a screen that does not provide sufficient readability for the procedure and a device without a screen.

Given that situation, a description will be provided of a method for, continuously from the above-described registration processing, setting the start of communication using a Bluetooth® link used in the registration processing.

A screen 900 is a window on which the browser 325 on the computer 111 is displaying and executing HTML and/or JavaScript code that form a web application acquired from the web application server 311 on the server 121. A URL 901 is the URL of the web application server 311 that is being open on the browser 325. A field 902 displays therein the model name of the device 131 that has been acquired through the above-described Web Bluetooth® communication having been established. A field 903 displays the serial number that has been acquired likewise. In the example of the screen 900, the statement of agreement on data transmission is displayed to the effect that data is transmitted from the device 131 to the server 121 on the Internet. The content of the agreement includes contract provisions, such as a transmission destination, types of data to be transmitted, and the purpose of use. Obtaining agreement with the provisions from the user is deemed as being granted with permission to activate communication from the device 131 to the web application server 311. Unless the user agrees with the provisions, communication from the device 131 is not started. A button 905 is used for a user to agree with the provisions in the statement of agreement on data transmission and activate the communication. A button 906 is provided for canceling operations without agreeing. A screen 910 is a result display screen for the data transmission setting.

FIG. 10 is a flowchart illustrating processing within the system that involves the web application.

In S1001, the browser 325 is started up, and the URL 901 of the web application is designated. This designation may be implemented by navigation using a URL link (not illustrated) provided on the screen 510.

In S1002, the browser 325 transmits a web content request to the web application server 311. In S1003, the web application server 311 returns, as a response, contents of HTML/JavaScript or other format that form the web application. In S1004, the browser 325 displays and executes the received HTML/JavaScript-format contents. Up to this stage, information about the URL 901 and the fields 902 and 903 in the screen 900 has been provided, and information about the statement of agreement on data transmission and the buttons 905 and 906 has not been provided.

In S1005, a read request instruction for acquiring the agreement state on data transmission is issued from within the program of the JavaScript code 326 to the browser API 327. In S1006, the browser 325 transmits a data read request to the device 131 via the OS 322. In S1007, the device 131 returns data as a response. The data includes a value indicating the agreement state on data transmission.

In S1008, within the program of the JavaScript code 326, the agreement state on data transmission returned as a response is checked, and it is determined whether the agreement has been obtained. If it is determined that the agreement has been obtained, the screen 910 is provided, and the processing illustrated in FIG. 10 ends. If it is determined that the agreement has not been obtained, the processing in the subsequent operations is executed.

In S1009, from within the program of the JavaScript code 326, a read request instruction for acquiring the statement of agreement is issued to the browser API 327. In S1010, the browser 325 transmits a data read request to the device 131 via the OS 322. In S1011, the device 131 returns data including the statement of agreement as a response. In S1012, the browser 325 displays the received statement of agreement within the screen 900. In this example, the statement of agreement is acquired from data stored in the device 131. However, the statement of agreement may be acquired from the web application server 311 by use of a protocol, such as HTTP.

In S1013, the browser 325 detects a user operation on the screen 900. In S1014, within the program of the JavaScript code 326, it is determined whether the detected user operation indicates agreement. If the user has not agreed, the processing is canceled, and the processing illustrated in FIG. 10 ends. If it is determined that the user has pressed the button 905 for agreement, the processing proceeds to the subsequent operations.

In S1015, a write request instruction for setting the agreement state to "agreement obtained" is issued to the browser API 327 from within the program of the JavaScript code 326. In S1016, the browser 325 transmits a data write request to the device 131 via the OS 322. In S1017 the device 131 records the agreement state in the data storage unit 334 as requested and returns a write request result as a response. In S1018, the browser 325 displays the screen 910 in accordance with the received result.

In S1021, the device 131 starts transmitting data in the device 131 to the server 121. The data to be transmitted may include the serial number, the network address, statuses regarding consumable items, and the agreement state about data transmission of the device 131. The web application server 311 that has received these pieces of information via the web API 312 monitors the statuses on the consumable items. The web application server 311 executes, as needed, processing for automatically delivering a supply of an applicable consumable item to the address of the user, which is associated with the serial number at the time of the device registration.

According to the present example embodiments, the identifier (serial number) of a device can be automatically input to a registration screen and correctly registered in a server by use of an web application using a Web Bluetooth® communication link. In particular, the present example embodiments are more effective when the device is a small IOT device, for which it is difficult to find the serial number thereof and on which it is difficult to print a bar code.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method preformed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-201270, which was filed on Oct. 25, 2018 and which is hereby incorporated by reference herein in its entirety.

What is claimed is:

1. An information processing apparatus that a web browser operates on and that executes a web application provided by a server by using the web browser, the information processing apparatus comprising at least one memory storing instructions, wherein the instructions cause the information processing apparatus to:
   execute, according to an execution of scripts as parts of the web application by the web browser, a data request for acquiring an identifier of a device from the device without through the server; and
   transmit, to the server, an identifier included in a response returned from the device following the data request.

2. The information processing apparatus according to claim 1,
   wherein the instructions further cause the information processing apparatus to execute a search instruction to search for a device capable of communicating with the information processing apparatus via Bluetooth® by using the web browser in a case where the information processing apparatus is instructed to make a search using Bluetooth® via a screen provided by the web application, and
   wherein the data request is executed for a device for which it is determined that connection by the web application is permitted using the web browser.

3. The information processing apparatus according to claim 1, wherein the instructions further cause the information processing apparatus to execute a search instruction to search for one or more devices capable of communicating with the information processing apparatus,
   wherein the web browser displays a prompt including information about one or more devices that have responded to a request executed by an operating system (OS) of the information processing apparatus based on the search instruction,
   wherein the prompt is provided to select one device to which a connection by the web application is permitted from among the one or more devices or to cancel the connection by the web application, and
   wherein the data request is executed for the selected device from the prompt.

4. The information processing apparatus according to claim 3, wherein, in the information processing apparatus, based on a device having been selected on the prompt as a target for permission, pairing for communication using Bluetooth® is executed between the information processing apparatus and the selected device.

5. The information processing apparatus according to claim 3,
   wherein the instructions further cause the information processing apparatus to execute a determination instruction to determine whether each of the one or more devices that have responded based on the search instruction is of a specific type, and
   wherein, on the prompt, information only about a device that has been determined as the specific type based on the determination instruction is displayed.

6. The information processing apparatus according to claim 1, wherein acquiring the identifier of the device includes transmitting, in response to an instruction from the web browser, a wireless signal from the information processing apparatus to the device.

7. The information processing apparatus according to claim 6, wherein acquiring the identifier of the device includes receiving, at the information processing apparatus, a wireless signal that was transmitted by the device,
   wherein the wireless signal that was transmitted by the device includes the identifier.

8. A method for an information processing apparatus that a web browser operates on and that executes a web application provided by a server by using the web browser, the method comprising:
   executing, according to an execution of scripts as parts of the web application by the web browser, a data request instruction for acquiring an identifier of a device from the device without through the server; and
   transmitting, to the server, an identifier included in a response returned from the device following the data request.

9. The information processing apparatus according to claim 8, wherein the instruction from the web browser causes an operating system to control a wireless communication unit to transmit the wireless signal from the information processing apparatus to the device.

10. The information processing apparatus according to claim 9, wherein the wireless communication unit is a Bluetooth controller.

11. A non-transitory computer-readable storage medium having computer executable instructions stored thereon, wherein the instructions cause a computer to:
   execute, according to an execution of scripts as parts of a web application by a web browser, a data request for acquiring an identifier of a device from the device without communicating through a server, wherein the web browser executes the web application; and
   transmit, to the server, an identifier included in a response returned from the device following the data request.

* * * * *